United States Patent [19]
Saperstein et al.

[11] Patent Number: 5,812,801
[45] Date of Patent: Sep. 22, 1998

[54] APPARATUS AND METHOD FOR IMPLEMENTING AN ALTERNATE BUS STANDARD IN A COMPUTER SYSTEM NOT DESIGNED FOR THE ALTERNATE BUS STANDARD

[75] Inventors: William A. Saperstein, San Carlos; David B. Townsley, Cupertino; Daniel G. Miranda, Campbell, all of Calif.

[73] Assignee: Apple Computer, Inc., Cupertino, Calif.

[21] Appl. No.: 603,508

[22] Filed: Feb. 20, 1996

[51] Int. Cl.⁶ .................................................. G06F 13/00
[52] U.S. Cl. .......................... 395/308; 395/309; 395/282
[58] Field of Search .................................... 395/281–282, 395/821–822, 306–309, 500

[56] References Cited

U.S. PATENT DOCUMENTS

| | | | |
|---|---|---|---|
| 4,586,159 | 4/1986 | Thomas et al. | 395/500 |
| 4,898,548 | 2/1990 | Bottoms et al. | 439/652 |
| 4,914,625 | 4/1990 | Billian | 395/181 |
| 5,043,877 | 8/1991 | Berger et al. | 395/290 |
| 5,083,259 | 1/1992 | Maresh et al. | 395/306 |
| 5,174,762 | 12/1992 | Hoppal et al. | 439/61 |
| 5,175,536 | 12/1992 | Aschliman et al. | 340/825.04 |
| 5,184,691 | 2/1993 | Ramirez et al. | 439/59 |
| 5,218,690 | 6/1993 | Boioli et al. | 395/500 |
| 5,287,460 | 2/1994 | Olsen et al. | 395/883 |
| 5,379,403 | 1/1995 | Turvy | 395/500 |
| 5,412,643 | 5/1995 | Kogure | 370/225 |
| 5,426,739 | 6/1995 | Lin et al. | 395/309 |
| 5,440,755 | 8/1995 | Harwer et al. | 395/800 |
| 5,457,785 | 10/1995 | Kikinis et al. | 395/308 |
| 5,572,688 | 11/1996 | Sytwu | 395/309 |

*Primary Examiner*—Ayaz R. Sheikh
*Assistant Examiner*—Sumati Lefkowitz
*Attorney, Agent, or Firm*—Mark A. Aaker

[57] ABSTRACT

An apparatus and method to accomodate a card designed to operate, with an alternate bus standard within a computer designed to operate with a primary bus standard, where the primary bus standard and the alternate bus standard are not directly compatible. The card is designed to fit within the computer in the available physical space and to connect to a card connector as required for the primary bus. However, the card is designed to be electrically compatible with the alternate bus standard. In a preferred embodiment the card draws power and any other signals, perhaps including clock, that are useful to both bus standards, but the address, data and control bus signals for the alternate bus are delivered to the card through an independent channel. This independent channel can be a separate connector to carry any signals needed for the alternate bus standard, which according to the application may or may not repeat signals already available through the primary bus.

8 Claims, 2 Drawing Sheets

APPARATUS AND METHOD FOR IMPLEMENTING AN ALTERNATE BUS STANDARD IN A COMPUTER SYSTEM NOT DESIGNED FOR THE ALTERNATE BUS STANDARD

FIELD OF THE INVENTION

The field of the invention pertains to computers using a selected one or more bus standards, where the computer is primarily designed to use a first or primary bus standard but at least in some circumstances can be used beneficially with a second bus standard, generally incompatible with the first bus standard. In particular, the field of the invention pertains to a system designed to use the PCI bus standard but providing a device and method for using cards or accessories using the ISA bus standard but using a PCI slot.

BACKGROUND OF THE INVENTION

The components of modern computers are generally coupled electronically at least in part through the use of one or more buses. A typical system uses a standard bus for sharing address, data and command lines between a number of components of the system. Such a bus is generally connected to one or more printed circuit card connectors whereby an accessory card can be inserted into any available connector for communication with other components of the system. The connector generally supplies power, clock and other system signals including address, data and control signals as needed according to the relevant bus standard.

Referring to FIG. 1, a representative mother board 10 may provide sockets for connecting some number of cards 12. This general structure is in wide use in personal computers such as IBM-compatible and Macintosh computers and in other computers as well, although the specific bus standard may not be identical between different types of computers.

The standards for any particular bus are generally made known to and adopted by multiple companies, although some bus standards may be limited to a particular manufacturer and perhaps may be unique to a single product, Widely known buses include the NuBus standard often used with Macintosh® computers, VME bus used by a number of minicomputers, the ISA and EISA standards widely used in IBM-compatible personal computers, and the MCA standard developed and used by IBM. A bus standard that is coming into widespread use today is PCI (Peripheral Component Interconnect), currently designed into many Macintosh and IBM-compatible computers. The formal specification for PCI, now available in version 2.1, is widely known in the computer industry. This spells out mechanical and electrical requirements for the PCI bus, including timing for typical bus transactions and the physical characteristics of printed circuit cards for use with the standard.

One effect of having a published standard for a bus architecture is that multiple manufacturers may develop and distribute cards for use with a given bus standard. In general, a given family of computers may be designed over many years to use the same standard. If a consumer purchases multiple computers using the same bus standard, then a card purchased for one computer using the standard will, for the most part, work in many other computers using the same standard. Over time, many consumers acquire a variety of cards for use with that bus standard. However, when the consumer wishes to use a computer which uses a different bus standard, older cards in general will not work with the new bus standard. As just one example, if a consumer has an IBM-compatible computer manufactured before about early 1995, it is likely to have an internal ISA (or EISA) bus. When EISA was introduced as a superset of ISA, many EISA systems could recognize and accomodate ISA cards because of electrical and physical similarities between the two standards.

However, if the consumer buys one of a growing number of Macintosh or IBM-compatible computers in late 1995, it may well have an internal PCI bus. Since the ISA bus standard is incompatible with the PCI standard, trying to use an ISA card in a PCI system is impossible. The physical connectors have a different shape, and the electrical specification calls for different signals and different timings. Thus the old card cannot be used directly with the new computer.

This same problem arises in a situation where a computer system is provided with multiple processors, one or more of which are designed to work on one bus system and one or more designed to work on a different bus system, incompatible with the first bus system. For example, many Macintosh computers are designed to use the NuBus bus standard. Other Macintosh computers include a processor direct slot (PDS) to provide access to a motherboard bus. Most computers using an Intel or Intel-compatible processor are designed to use the ISA, EISA or "Pentium Bus" bus standard, none of which is compatible with NuBus or Macintosh PDS.

A number of manufacturers, including Apple Computer, Inc. of Cupertino, Calif., make a coprocessor card for various Macintosh models which include a processor suitable for use with an IBM-compatible system, such as an Intel® 486, but the coprocessor card is designed to fit into a PDS slot. Other products, specifically including graphic accelerators using one or more co-processors, may be designed to fit into a NuBus slot, or in recent computers, a PCI slot. However, IBM-compatible computer applications are in general designed to be used with cards based on the ISA bus standard and many computers, including Macintosh, do not include any slots or provision to accommodate any ISA cards.

The newest models of Power Macintosh computers are designed to use the PCI bus standard and each of models 7200, 7500, 8500 and 9500 include at least three slots ready to receive a PCI card. Newer models of IBM compatible computers also may include one or more PCI slots. However, when adding an IBM compatible co-processor, on a card or otherwise, to a Macintosh computer designed for NuBus or PCI standard cards, there has been no straightforward way to accommodate an ISA-standard card. In fact, even when using an Intel or Intel-compatible processor in a new system designed for PCI but not ISA cards, there is no straightforward way to accommodate an ISA-standard card. A wide variety of computers are shipping today that include PCI slots but no ISA slots. However, a great many ISA cards are used in computers which just recently included most personal computers in the industry and it would be advantageous to be able to use older, ISA cards in newer machines with only PCI slots. These same problems occur if one seeks, for example, to use a NuBus card in a PCI machine, or a NuBus card in a PDS slot.

What is needed is a device or method that would allow inclusion of a card operating under one bus system but mounted within a system designed for a different bus system, incompatible with the bus system for which the card was designed. In particular, it would be helpful to be able to use existing card resources, designed for an older bus standard, in a system with a new bus standard without adapting or modifying the existing card resources.

SUMMARY OF THE INVENTION

The present invention provides within a computer designed to operate with a primary bus standard a mechanism for accommodating a card designed to operate with an alternate bus standard, where the primary bus standard and the alternate bus standard are not directly compatible. The card is designed to fit within the computer in the available physical space, to connect to a card connector provided in the system for cards complying with the primary bus standard. However, the card is designed to be electrically compatible with the alternate bus standard. In a preferred embodiment the card draws power and any other signals, such as clock, that are useful, but the address, data and control bus signals for the alternate bus are delivered to the card through an independent channel. This independent channel can be a separate connector to carry any signals needed for the alternate bus standard, which according to a specific engineering application may or may not repeat signals already available through the primary bus.

In one particularly preferred embodiment of the new invention, a card in the PCI form factor, fitted with a PCI connector, is also provided with a connector (called an "XD expansion connector" in one preferred form as set out in this description) to accomodate ISA signals.

It is one object of this invention to provide a means to insert a printed circuit card within a physical space designed for one bus standard but to provide functionality and connectivity to operate according to a second bus standard.

This and other objects and advantages of the invention, as well as the details of an illustrative embodiment, will be more fully understood from the following specification and drawings.

DETAILED DESCRIPTION OF THE INVENTION

Figure 1:
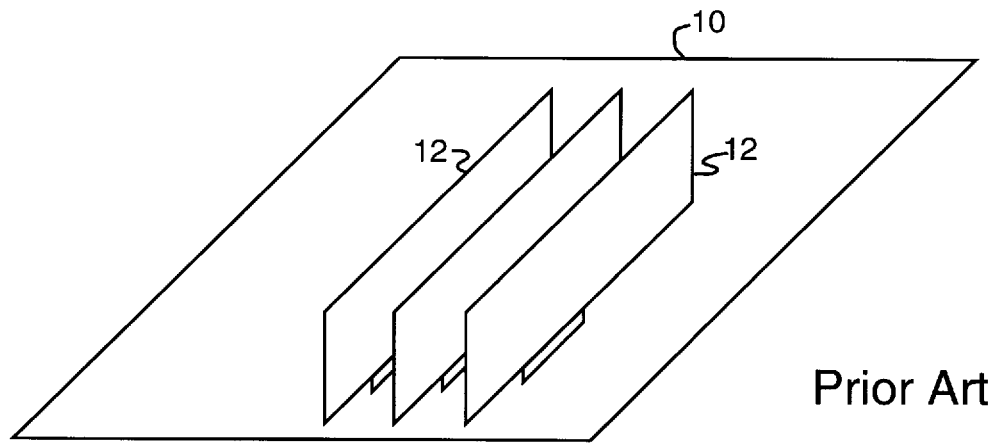
FIG. 1 illustrates a computer with three slots according to the prior art.

If a user desires some functionality available only on one bus but the available computer supports only a second, incompatible bus, the user today has no options except to look for some equivalent functionality that will work on the second bus. Different bus standards specify different electrical functions and, in general, different signals, timing and protocols and, for the most part, a card designed to use one bus standard cannot function according to another bus standard. Typically, different software support is required, which may be a second compatibility barrier.

In addition, since the physical form factor specified for cards generally differs with different bus standards, it may not be possible even to physically insert a card designed for one standard into the space designed for a second standard, say, an ISA card into a PCI slot, or vice versa. These differences may include: the number of electrical connections; the position of a card edge connector relative to the I/O back plane; and the overall card dimensions.

As just one example, a card designed for PCI will not work on an ISA bus. One skilled in the art will recognize other bus pairs that are not wholly compatible where it would be useful to find a way to connect a card designed for one bus to a slot designed for the other bus.

To illustrate the electrical differences, Tables 1A and 1B list all of the pins and all of the electrical signals found in an ISA card connector. The timing characteristics of various signals are well known and described, for example, in E. Solari, "AT BUS DESIGN", Annabooks, San Diego (1991) or R. M. Cram, "MICROPROCESSOR BUSSES", Academic Press, Inc., San Diego (1991) (the source of the information in Tables 1A and 1B—Ibid., pp. 140–41).

TABLE 1A

ISA and EISA Pin assignments (Clad Side)

| Pin number | Signal | Pin number | Signal | Pin number | Signal |
|---|---|---|---|---|---|
| A1 | IO CH CK/ | A17 | A14 | C1 | SBHE |
| A2 | D7 | A18 | A13 | C2 | LA23 |
| A3 | D6 | A19 | A12 | C3 | LA22 |
| A4 | D5 | A20 | A11 | C4 | LA21 |
| A5 | D4 | A21 | A10 | C5 | LA20 |
| A6 | D3 | A22 | A9 | C6 | LA19 |
| A7 | D2 | A23 | A8 | C7 | LA18 |
| A8 | D1 | A24 | A7 | C8 | LA17 |
| A9 | D0 | A25 | A6 | C9 | MEMR/ |
| A10 | IO CH RDY | A26 | A5 | C10 | MEMW/ |
| A11 | AEN | A27 | A4 | C11 | SD08 |
| A12 | A19 | A28 | A3 | C12 | SD09 |
| A13 | A18 | A29 | A2 | C13 | SD10 |
| A14 | A17 | A30 | A1 | C14 | SD11 |
| A15 | A16 | A31 | A0 | C15 | SD12 |
| A16 | A15 | | | C16 | SD13 |
| | | | | C17 | SD14 |
| | | | | C18 | SD15 |

TABLE 1B

ISA and EISA Pin assignments (Component Side)

| Pin number | Signal | Pin number | Signal | Pin number | Signal |
|---|---|---|---|---|---|
| B1 | GND | B17 | DACKA/ | D1 | MEM CS16/ |
| B2 | RESET DRV | B18 | DRQ1 | D2 | IO CS16/ |
| B3 | +5 VDC | B19 | REFRESH | D3 | IRQ10 |
| B4 | IRQ2 | B20 | CLOCK | D4 | IRQ11 |
| B5 | −5 VDC | B21 | IRQ7 | D5 | IRQ12 |
| B6 | DRQ2 | B22 | IRQ6 | D6 | IRQ15 |
| B7 | −12 VDC | B23 | IRQ5 | D7 | IRQ14 |
| B8 | SRDY | B24 | IRQ4 | D8 | DACK0/ |
| B9 | +12 VDC | B25 | IRQ3 | D9 | DRQ0 |
| B10 | GND | B26 | DACK2/ | D10 | DACK5/ |
| B11 | MEMW/ | B27 | T/C | D11 | DRQ5 |
| B12 | MEMR/ | B28 | ALE | D12 | DACK6/ |
| B13 | IOW/ | B29 | +5 VDC | D13 | DRQ6 |
| B14 | IOR/ | B30 | OSC | D14 | DACK7/ |
| B15 | DACK3/ | B31 | GND | D15 | DRQ7 |
| B16 | DRQ3 | | | D16 | +5 VDC |
| | | | | D17 | MASTER/ |
| | | | | D18 | GND |

Figure 2:
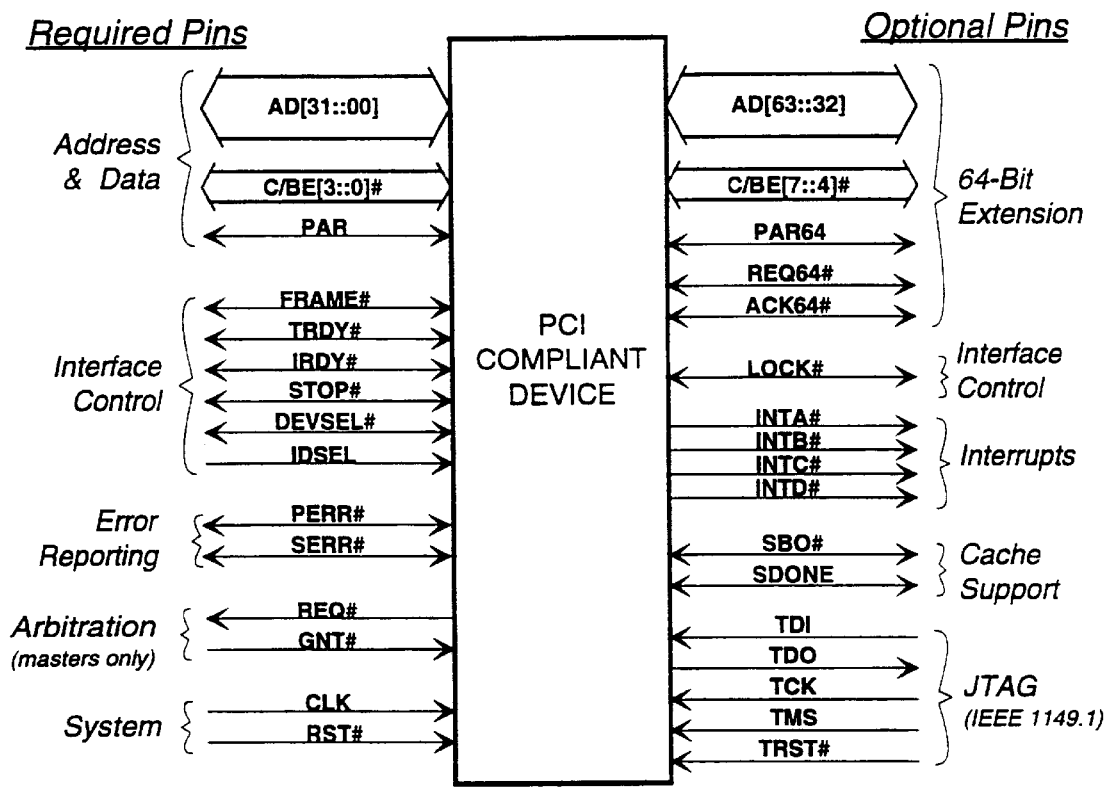
FIG. 2 illustrates the assignment of electrical signals for a PCI compliant device.

In contrast, the PCI standard requires its own unique set of signals. Referring to FIG. 2, a series of required pins are shown on the left side of the "PCI Compliant Device", including address and data lines 0 through 31. FIG. 2 does not include power or ground signals. However, the number of pins assigned to carry power to a PCI card is illustrative. Note that the current PCI standard can accommodate 5 volt as well as 3.3 volt designs, in a 32 bit form or a 64 bit form.

TABLE 2A

PCI Power - 32 bit card

| Pin Type  | 5V Board | Universal Board | 3.3V Board |
|-----------|----------|-----------------|------------|
| Ground    | 16       | 16              | 16         |
| +5 V      | 6        | 0               | 0          |
| +3.3 V    | 6        | 0               | 6          |
| I/O pwr   | 0        | 6               | 0          |
| Reserved  | 5        | 5               | 5          |

TABLE 2B

PCI Power - 64 bit card

| Pin Type  | 5V Board | Universal Board | 3.3V Board |
|-----------|----------|-----------------|------------|
| Ground    | 22       | 18              | 22         |
| +5 V      | 13       | 8               | 8          |
| +3.3 V    | 12       | 12              | 17         |
| I/O pwr   | 0        | 5               | 0          |
| Reserved  | 6        | 6               | 6          |

Accommodating cards of multiple, generally incompatible bus standards is particularly a problem in a computer providing support for multiple operating systems where one operating system is commonly used with one bus standard and the second operating system is commonly used with a second, incompatible bus standard. The problem is accentuated in that applications written to work with a given operating system are written assuming that accessory cards are available that work with the expected bus standard. If two operating systems are now working in the same computer, the user may need to support two bus standards in the same computer. With the differences in physical form factor and electrical incompatibility between different bus standards, this is a serious problem.

Figure 3:
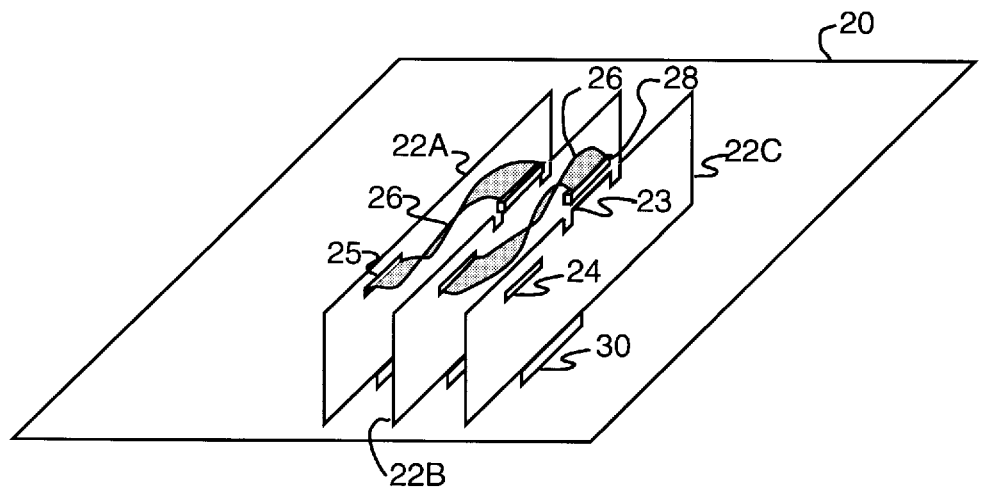
FIG. 3 illustrates one preferred means of adding connectivity for a second bus in the presence of a primary bus.

The present invention avoids this problem by providing functionality for an alternate bus standard in a form factor compatible with a primary bus standard which is supported by the host computer. Referring to FIG. 3, by way of example of a preferred embodiment, mother board 20 supports cards 22A, 22B, 22C, each of which fit within the form factor defined for the primary bus for the mother board 20. It is sufficient if each card 22A, 22B, 22C fits within the outside dimensions specified for that form factor, but it is preferable if each card 22A, 22B, 22C conforms to the specified form factor. Card edge 30 fits into a matching connector (not shown) on mother board 20 according to the primary bus standard.

To support the alternative bus, one or more cards 22A, 22B, 22C may be fitted with alternative bus connector 24. Another card 22B, 22C may be fitted with a receiving alternative bus connector such as card edge connector 23. Ribbon cable 26 is fitted with connectors 25 and 28 corresponding to matching connectors 24 and 23, respectively. In FIG. 2, connector 28 is shown as connected to card edge connector 23 on card 22B but corresponding connectors are shown not yet connected to card 22C. The alternative bus connectors and cable support any desired portion of the signals and lines required to support the alternative bus. Where some corresponding lines are also found in the primary bus (particularly power), one skilled in the art can choose which lines to use through the primary bus and which lines to use through the secondary bus.

It is preferable to provide a bus interface somewhere in the system. Referring to FIG. 3, card 22A supports the full interface to the primary bus of mother board 20. Card 22A also supports the full interface to the alternative bus. This support includes generating signals or support lines, such as −5V, needed in ISA but not provided under PCI. Since other cards utilizing or supporting the alternative bus can be added in any number (none, one or more), each such card can be simply daisy chained as shown. In principle, a large number of cards can be connected in this manner, but in practice, one skilled in the art recognizes that bus transmission issues affect specific configurations.

This design allows a card manufacturer to make relatively minor modifications to an existing design to manufacture a modified card supporting the alternative bus architecture but ready to operate in a different primary bus environment.

In one particularly preferred embodiment, the primary bus may be a PCI bus. The alternative bus may be ISA. Where the parent system is an IBM-compatible computer, based perhaps on a Pentium™ CPU, card 22A may be no more than a bridge interface to manage signals between the primary PCI bus and the alternative ISA bus, and providing, where needed additional signals or lines such as −5 V power which are not available through PCI. Card 22A might also carry a coprocessor, such as a second Pentium CPU, for controlling and interfacing with one or more ISA bus cards and communicating as needed through the primary PCI bus with the main CPU for the system.

This latter scheme is particularly useful where the parent system is not an IBM-compatible computer but instead is a different computer such as a Macintosh running an operating system different than the operating system on the coprocessor. Given an appropriate interface, the primary CPU and operating system may operate according to one set of instructions while the coprocessor operates according a second set of instructions under a second operating system (even an operating system incompatible with the primary CPU). In a particularly preferred embodiment, each processor can access various resources available to the other operating system, as needed.

In one preferred embodiment, connections are made to +5 V, GND, +12 V and −12 V from the host PCI bus. These connections are connected as needed to ISA connector 24. One or more of these lines (such as −12V or from +12V) may be used by a voltage regulator (not shown), which could be located on any one or more of cards 22A, 22B or 22C, to generate and provide −5V to support ISA functions as needed. For one skilled in the art, this circuit is simple to design from current industry standard electronic components and data sheets.

In one preferred embodiment, connector 24 is designed to connect selected signals from card to card as described in detail above in relation to FIG. 3. These selected signals, described below in more detail, may include all address, data and control signals for ISA, some subset of those signals, or a superset, such as all necessary EISA signals. ISA, ISA subset, or EISA or some other combination of signals may be selected in any particular situation as needed.

The selected signals for connectors 23 and 24 may preferably include:

TABLE 3

Selected Signals for XD Alternate Bus

| | ISA | EISA | ISA Subset |
|---|---|---|---|
| A, LA | (19:0) | (23:0) | (10:0) |
| IRQ | 9, (7:3) | (15:14, 12:9, 7:3) | (10, 9, 7, 4, 3) |
| MEMR/ | x | x | x |
| MEMW/ | x | x | x |
| IOR/ | x | x | x |
| IOW/ | x | x | x |
| DRQ | (3:1) | (7:5, 3:0) | (6, 3) |
| DACK/ | (3:1) | (7:5, 3:0) | (6, 3) |
| T/C | x | x | x |
| ALE | x | x | x |
| REFRESH | x | x | x |
| CLOCK | x | x | x |
| 14M CLK (OSC) | x | x | x |
| IO CH CK/ | x | x | x |
| IO CH RDY | x | x | x |
| AEN | x | x | x |
| RESET DRV | x | x | x |
| SRDY | x | x | x |
| D, SD | (7:0) | (15:0) | (7:0) |
| MEM R/ | | x | |
| MEM W/ | | x | |
| SBHE | | x | |
| MEM CS16/ | | x | |
| IO CS16/ | | x | |
| MASTER | | x | |

A general description of the device and method of using the present invention as well as a preferred embodiment of the present invention has 10 been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. An apparatus supporting an alternate bus in a computer with a primary bus not wholly compatible with the alternate bus, said apparatus comprising;

a computer which supports a primary bus;

in the computer, at least one connector slot designed to support, physically and electrically, a card compatible with that primary bus;

a card mechanically compatible with the primary bus and electrically compatible with an alternate bus but not directly electrically compatible with all signals of the primary bus, wherein said card lacks means for interfacing signals between the primary bus and the alternate bus;

said card mechanically connected to a first connector slot of said at least one connector slot;

an alternate-bus-compatible electrical connector connected to said card to provide electrical connectivity for said card to said alternate bus; and a processor connected to said computer and to said alternate bus.

2. The apparatus of claim 1 wherein for said card the address and data lines of said primary bus are not used.

3. The apparatus of claim 1 further comprising;

a second card mechanically and electrically compatible with said primary bus, said second card connected to a second connector slot of said at least one connector slot;

a bus interface device on said second card for interfacing with said alternate bus; and a second alternate-bus-compatible electrical connector connected to said bus interface device to provide electrical connectivity to said alternate bus.

4. The apparatus of claim 1 further comprising means for generating an alternate power line needed for the alternate bus but not available from the primary bus, said means for generating having an input connected to one or more available primary bus power lines, and an output connected to said alternate-bus-compatible electrical connector.

5. The apparatus of claim 1 further comprising a second card electrically compatible with said alternate bus but mechanically compatible with said primary bus, said second card connected to a second connector slot of said at least one connector and a second alternate-bus-compatible electrical connector connected to said second card to provide electrical connectivity to said alternate bus.

6. The apparatus of claim 5 further comprising a third card electrically compatible with said alternate bus but mechanically compatible with said primary bus, said third card connected to a third connector slot of said at least one connector slot; and a third alternate-bus-compatible electrical connector connected to said third card to provide electrical connectivity to said alternate bus.

7. The apparatus of claim 6 wherein said third alternate-bus-compatible electrical connector can be daisy chained to additional, similar cards.

8. A method of providing an alternate bus in a computer with a primary bus, said method comprising:

providing a computer with a primary bus and at least one connector connectable to a card compatible with that primary bus;

providing a card mechanically compatible with the primary bus and electrically compatible with an alternate bus but not directly electrically compatible with all signals of the primary bus, wherein said card lacks means for interfacing signals between the primary bus and the alternate bus;

connecting said card to a first connector of said at least one connector;

connecting an alternate-bus-compatible electrical connector to said card to provide electrical connectivity to said alternate bus; and connecting a processor to said card through the alternate-bus-compatible electrical connector.

* * * * *

UNITED STATES PATENT AND TRADEMARK OFFICE
CERTIFICATE OF CORRECTION

PATENT NO : 5,812,801

DATED : September 22, 1998

INVENTOR(S) : William A. Saperstein, et al.

It is certified that error appears in the above-identified patent and that said Letters Patent is hereby corrected as shown below:

Claim 5, Column 8, line 24, should read - -connector slot and- -.

Signed and Sealed this

Twenty-third Day of February, 1999

Attest:

Q. TODD DICKINSON

Attesting Officer

Acting Commissioner of Patents and Trademarks